United States Patent
Saluja

(10) Patent No.: US 8,493,845 B1
(45) Date of Patent: *Jul. 23, 2013

(54) APPARATUS FOR ACCELERATING FAILOVER OF VPN TRAFFIC IN AN MPLS PROVIDER NETWORK

(75) Inventor: Rajesh Saluja, Nashua, NH (US)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,860

(22) Filed: Jan. 30, 2012

Related U.S. Application Data

(63) Continuation of application No. 10/851,032, filed on May 21, 2004, now Pat. No. 8,107,363.

(51) Int. Cl.
*H04L 1/00* (2006.01)

(52) U.S. Cl.
USPC ............................ 370/228; 370/392; 709/236

(58) Field of Classification Search
None
See application file for complete search history.

(56) References Cited

U.S. PATENT DOCUMENTS

| | | | |
|---|---|---|---|
| 6,687,245 | B2 | 2/2004 | Fangman et al. |
| 7,149,917 | B2 | 12/2006 | Huang et al. |
| 7,369,772 | B2 | 5/2008 | Gerstel et al. |
| 2002/0191247 | A1 | 12/2002 | Lu et al. |
| 2003/0095554 | A1 | 5/2003 | Shimizu |
| 2005/0083928 | A1 | 4/2005 | Sivabalan et al. |

OTHER PUBLICATIONS

Anderson, L., Framework for Layer 2 Virtual Private Networks (L2VPNs), Network Working Group, Internet Draft, Mar. 2004, 43 pages.
Lassere, M. et al., "Virtual Private LAN Services over MPLS," Internet Draft Document, Jun. 2003, 25 pages.
Martini, L et al., "Encapsulation Methods for Transport of Ethernet Frames Over IP/MPLS Networks," Network Working Group, Internet Draft, Apr. 2004, 21 pages.
Martini, L. et al., "Pseudowire Setup and Maintenance using LDP," Network Working Group, Internet Draft, Mar. 2004, 33 pages.

(Continued)

*Primary Examiner* — Jianye Wu
(74) *Attorney, Agent, or Firm* — Withrow & Terranova, PLLC

(57) ABSTRACT

Failover of VPN traffic between MPLS tunnels may be accelerated by determining a main and a standby MPLS tunnel for each VPN and passing both the main and standby MPLS tunnel information to the forwarding plane of a network element configured to implement the VPN. In the event of failover of a main MPLS tunnel interface, the forwarding plane may be instructed to use the standby MPLS tunnel instead of the main MPLS tunnel. Since the standby MPLS tunnel has already been determined, and information associated with the standby MPLS tunnel has already been provided to the forwarding plane, it is not necessary to recompute a new MPLS tunnel or reprogram the forwarding plane using the new MPLS tunnel information. By removing control plane operations and control plane-forwarding plane interaction from the handling of failovers, the failover recovery time may be accelerated to under 50 ms, to thereby enable VPN connections to handle time sensitive traffic.

10 Claims, 2 Drawing Sheets

OTHER PUBLICATIONS

Notice of Allowance for U.S. Appl. No. 10/851,032 mailed Sep. 26, 2011, 7 pages.
Non-final Office Action for U.S. Appl. No. 10/851,032 mailed May 3, 2011, 10 pages.
Notice of Panel Decision from Pre-Appeal Brief Review for U.S. Appl. No. 10/851,032 mailed Feb. 1, 2011, 2 pages.
Advisory Action for U.S. Appl. No. 10/851,032 mailed Apr. 14, 2010, 3 pages.
Non-final Office Action for U.S. Appl. No. 10/851,032 mailed Aug. 20, 2010, 8 pages.
Final Office Action for U.S. Appl. No. 10/851,032 mailed Jan. 25, 2010, 9 pages.
Non-final Office Action for U.S. Appl. No. 10/851,032 mailed Jun. 11, 2009, 6 pages.
Advisory Action for U.S. Appl. No. 10/851,032 mailed Oct. 10, 2008, 5 pages.
Final Office Action for U.S. Appl. No. 10/851,032 mailed Apr. 18, 2008, 7 pages.
Non-final Office Action for U.S. Appl. No. 10/851,032 mailed Nov. 7, 2007, 6 pages.
Non-final Office Action for U.S. Appl. No. 10/851,032 mailed Sep. 20, 2007, 25 pages.
Non-final Office Action for U.S. Appl. No. 13/360,867 mailed Jan. 23, 2013, 10 pages.
Final Office Action for U.S. Appl. No. 13/360,867, mailed Jun. 12, 2013, 5 pages.

US 8,493,845 B1

APPARATUS FOR ACCELERATING FAILOVER OF VPN TRAFFIC IN AN MPLS PROVIDER NETWORK

RELATED APPLICATIONS

This application is a continuation of co-pending U.S. patent application Ser. No. 10/851,032, entitled "Method and Apparatus for Accelerating Failover of VPN Traffic in an MPLS Provider Network," which was filed on May 21, 2004, and which is hereby incorporated herein by reference in its entirety.

FIELD OF THE INVENTION

The present invention relates to communication networks and, more particularly, to a method and apparatus for accelerating failover of VPN traffic in an MPLS provider network.

DESCRIPTION OF THE RELATED ART

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

A Virtual Private Network (VPN) may be formed by securing communications between two or more networks or network elements to form a VPN connection, such as by encrypting or encapsulating transmissions between the networks or network elements. Using VPN connections enables information to be exchanged securely between geographically dispersed sites without obtaining dedicated resources through the network.

There are several commonly utilized methods of establishing VPN connections on a network. For example, VPNs may be established by customers through the deployment of network elements configured with VPN software. Another way of establishing VPNs is to configure the VPN at the Provider Edge (PE) network elements to allow the service provider to provision VPN services on behalf of the customer. The service provider also provisions the tunnels between provider edge (PE) elements which are shared by many VPN sites attached to PE. The tunnels traverse through provider (P) network elements which are completely unaware of presence of any VPN. One common way to do this is described in Internet Engineering Task Force (IETF) Request For Comments (RFC) 2547, the content of which is hereby incorporated herein by reference. RFC 2547 describes a Layer 3 VPN architecture in which MultiProtocol Label Switching (MPLS)—based tunnels are used to forward VPN packets over the provider network backbone. Another common way to do this is described in IETF Internet Draft (ID) entitled "Framework for Layer 2 Virtual Private Networks (L2VPNs), by Eric Rosen, which allows for the creation of Layer 2 VPNs (L2VPNs), the content of which is hereby incorporated herein by reference. Once established, the provider tunnels may be used to pass data between the VPN sites attached to the PE elements on either end of the VPN connection.

FIG. 1 illustrates a simplified example of a network topology 10. In FIG. 1, traffic from a Customer Edge (CE) network element 12 associated with a first VPN site 14 is output to a Provider Edge (PE) network element 16. The PE 16 may be a separate device/machine on the network or, alternatively, may be instantiated as a process on another network element. MPLS tunnels 18A and 18B are determined by the PE network element 16 and implemented on the network 20 in a conventional manner. The MPLS tunnels terminate at a second PE network element 16 which interfaces a CE network element 12 associated with a second VPN site 14. Numerous protocols like RSVP-TE or LDP may be used to establish the MPLS tunnels on the network in a conventional manner.

When an end-point of an MPLS tunnel fails, such as when a card or port in the PE network element hosting the MPLS tunnel fails, it is necessary to switch the VPN traffic going over that tunnel to another MPLS tunnel between the same pair of PE elements. Where only one MPLS tunnel has been established between the end points, a new MPLS tunnel will need to be determined. Generally, however, to enable rapid failover of a VPN traffic between MPLS tunnels, multiple MPLS tunnels are set up between pairs of PE elements so that upon failure of one MPLS tunnel (e.g. MPLS tunnel 18A), the traffic may be quickly switched to another MPLS tunnel (e.g. MPLS tunnel 18B). Selection between available MPLS tunnels occurs via a tunnel selection algorithm.

To enable traffic to be transferred at very high data rates, network elements are constructed conventionally with a control plane configured to handle signaling, configuration, and other control information, and a forwarding plane configured to forward data based on lookup tables set in the forwarding plane by the control plane. For example, establishment of MPLS tunnels and mapping of a VPN traffic over an MPLS tunnel or a group of MPLS tunnels is handled by the control plane. MPLS tunnel information for the selected VPN connection is then passed from the control plane to the forwarding plane, which uses that information to program the processors and circuitry forming the forwarding plane to enable it to forward packets associated with the VPN onto the selected MPLS tunnel on the network.

When a port or card hosting the MPLS tunnel fails, the control plane needs to detect the failure, choose another MPLS tunnel using a tunnel selection algorithm, and program the forwarding plane with new MPLS tunnel information for the affected VPN connections. Since a given port or card in a PE network element may handle tens of thousands of VPNs, determining new MPLS tunnels for those VPNs and communicating that information from the control plane to the forwarding plane may take between hundreds of milliseconds to well over a second. While this may be an acceptable rate for particular types of traffic, the failover rate must be reduced to the order of 50 milliseconds if the VPN connections are to be able to be used to carry time-sensitive traffic, such as voice, and video traffic.

There have been attempts to reduce the failover rate using mechanisms included in the protocols already in use on the network. RSVP-TE is the most commonly used protocol to establish MPLS tunnels in an MPLS network. In RSVP-TE, one mechanism that may be used to reduce the failover rate is to reduce an interval associated with optional RSVP hello messages used to check integrity of the RSVP neighbor for the tunnel to as little as 5 ms, to thereby provide fast notification of a failed link or card. However, this solution is very processor intensive, requiring the generation and transmission of 200 hello messages per RSVP neighbor per second. Additionally, while this provides fast notification of a problem, it does not accelerate the manner in which the network element handles the problem once notified. Thus, where there are thousands or tens of thousands of VPN connections affected, the control plane may be incapable of reprogramming the forwarding plane with new MPLS tunnel information for the affected VPNs within a 50 ms failover period, even if it is notified of the problem in a timely manner.

SUMMARY OF THE INVENTION

The present invention overcomes these and other drawbacks by providing a method and apparatus for accelerating failover of VPN traffic between MPLS tunnels in a PE network element. According to an embodiment of the invention, a main and a standby MPLS tunnel are determined for each VPN endpoint by a control plane of the network element handling the VPN connection, and main and standby tunnel information is then passed from the control plane to the forwarding plane of the network element. In the event of failover of a main MPLS tunnel, the forwarding plane may be instructed to use the standby MPLS tunnel instead of the main MPLS tunnel. Since the standby tunnel has already been determined, and the standby information has already been provided to the forwarding plane, handling of failovers may be accelerated to under 50 ms to thereby enable VPN connections to handle time sensitive traffic.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
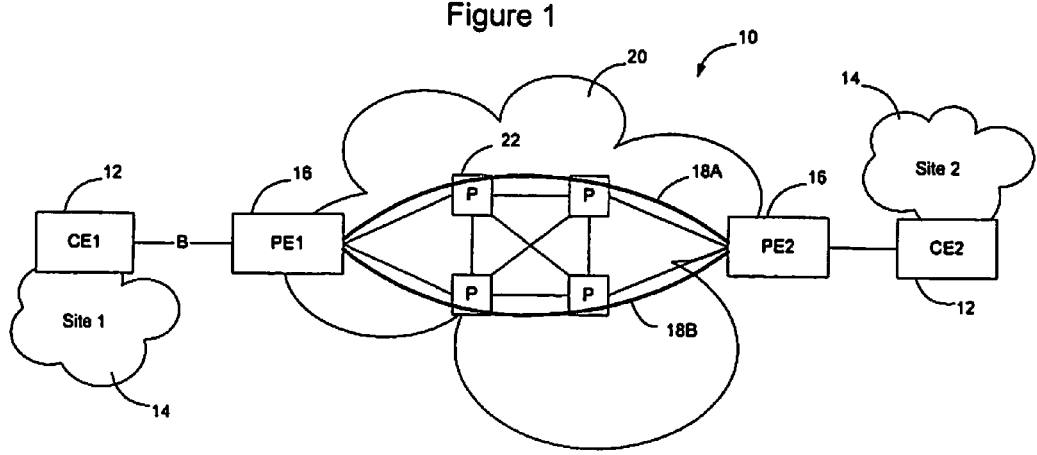
FIG. 1 is a functional block diagram of an example of a communication network.
Figure 2:
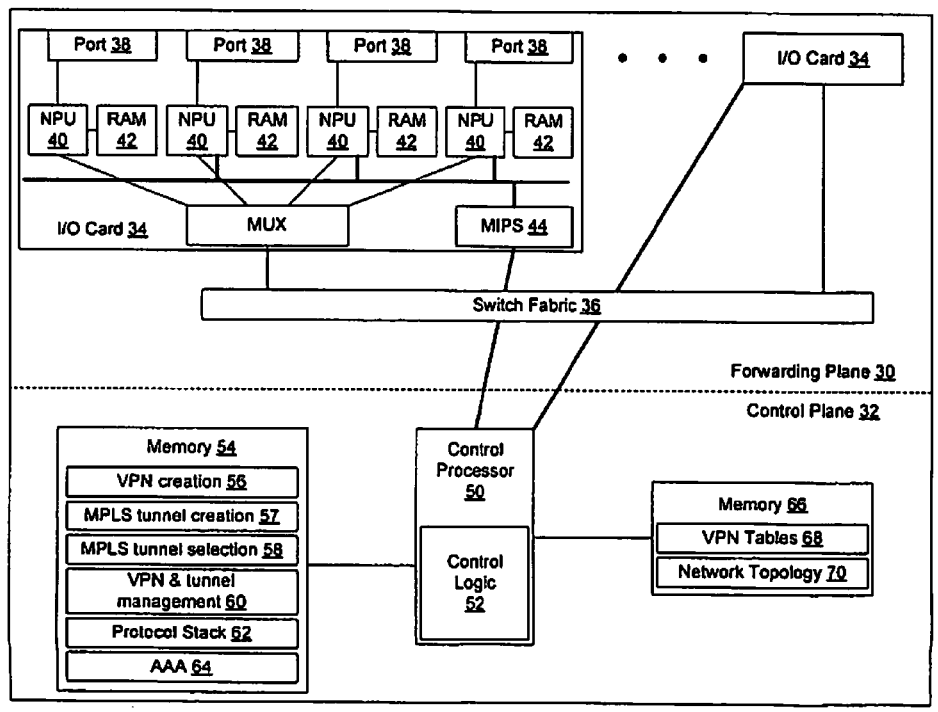
FIG. 2 is a functional block diagram of a network element according to an embodiment of the invention.

FIG. 2 illustrates an example of a PE network element 16 according to an embodiment of the invention, which is configured to operate on a network such as the network 10 illustrated in FIG. 1. As shown in FIG. 2, the network element includes a forwarding plane 30 and a control plane 32. The forwarding plane is optimized to make forwarding decisions and handle transmission of packets of data on the network. In the embodiment illustrated in FIG. 2, I/O cards 34 are interconnected by a switch fabric 36 to enable data received at a port on one of the I/O cards to be output at another port on the same I/O card or on a different I/O card. The invention is not limited by the particular structure in which the I/O cards are interconnected or a particular architecture in the forwarding plane 30.

The I/O cards are programmed by the control plane 32 to forward traffic on particular VPNs over designated MPLS tunnels. Each MPLS tunnel is associated with a particular interface provisioned over one or more of the ports hosted by the I/O cards 34. Upon failure of an MPLS tunnel, traffic for that MPLS tunnel will need to be forwarded over another MPLS tunnel going to the same destination PE. According to an embodiment of the invention, the I/O cards may be programmed with standby MPLS tunnel information as well as main MPLS tunnel information, such that upon failure of the main MPLS tunnel, traffic may be switched quickly to the standby MPLS tunnel without requiring the control plane to reprogram that information into the forwarding plane. This enables failover between MPLS tunnels to be accomplished in a very rapid manner to enable the tunnels to carry time sensitive VPN traffic such as voice transmissions and video transmissions.

FIG. 2 also illustrates an embodiment of an I/O card in greater detail. As shown in FIG. 2, the I/O card includes a plurality of ports 38 configured to interface with optical fibers or other physical transmission mediums. For example, the ports 38 may be gigabit optical interfaces such as gigabit Ethernet ports, or multi-gigabit optical interfaces, although the invention is not limited in this regard.

Traffic received over the ports 38 is passed to a network processing unit 40 associated with that port. The network processing unit interfaces with a memory 42 to enable it to perform a service label lookup, IP lookup, or other processing operations on the protocol data units received over the port. A MIPS processor 44 receives instructions from the control plane 32 and uses the instructions to program the network processors. Thus, for example, when main and standby MPLS tunnels for a VPN are determined, configuration information as well as main and standby MPLS tunnel information is passed to the MIPS processor 44, which then programs the network processing units 40 with the new information to allow them to handle VPN traffic. Optionally, the main and standby MPLS tunnel information may be stored in tables in memories 42, although the invention is not limited in this regard as the memory may be used by the network processing units 40 in many different ways.

The control plane of the network element is configured to implement MPLS tunnels on the network, map a VPN to a set of MPLS tunnels and to program the forwarding plane to enable the forwarding plane to handle traffic on the VPN connections on the network. Although an example of a control plane is illustrated in FIG. 2, the invention is not limited to this particular control plane architecture as numerous control plane architectures may be utilized in connection with embodiments of the invention.

As shown in FIG. 2, the control plane includes a control processor 50 containing control logic 52 configured to implement the functions ascribed to the network element discussed herein. A memory 54 may be provided including data and instructions to enable the control processor to create VPN connections for the sites attached to this PE 56, create MPLS tunnels originating on this PE 57, select MPLS tunnels for a VPN using a tunnel selection algorithm 58, and manage the VPN connections and MPLS tunnels once created 60. Creation, selection, and management of MPLS tunnels on a network is well known in the art and the invention is not limited to any particular manner of implementing these functions in the network element.

Optionally, the network element may also include additional software to enable the network element to operate on the network or to perform additional services on the network. For example, the network element may include a protocol stack 62 containing data and instructions relating to protocols in use on the network to enable the network element to engage in protocol exchanges associated with establishing, maintaining, and terminating MPLS tunnels on the network.

Additionally, an Authentication, Authorization, and Accounting (AAA) service 64 may be implemented on the network element to enable operations on the network associated with MPLS tunnels to take place in a secure environment. The invention is not limited to an embodiment including all or some of these particular features.

The control processor 50 may also have access to store of data, for example for use in connection with creation of VPN connections and MPLS tunnels on the network and mapping of a VPN connection to a set of MPLS tunnels. In the embodiment illustrated in FIG. 2, the control processor has access to a memory 66 containing VPN tables 68, and network topology information 70. The memory 66 may be part of memory 54 or may be separate, as illustrated. The invention is not limited to how the memory is implemented in the control plane or interfaced to the control plane.

The VPN table information 68 may associate particular VPNs with particular MPLS tunnels determined by a tunnel selection algorithm. Frequently, a PE will maintain a VPN topology that includes multiple sites in multiple locations, and may specify which sites are able to communicate with which other sites. The VPN tables maintain datasets to enable the PE network element to determine how VPN services should be provisioned on the network.

The memory 66 also includes network topology information 70 to enable it to maintain an understanding of the overall topology of the network. This is advantageous, for example, in the creation of MPLS tunnels on the network and may be obtained in a conventional manner, such as by running OSPF or another routing protocol on the network. The invention is not limited to the manner in which the network topology is created. Other data may be maintained by the network element as well and the invention is not limited to the embodiment illustrated in FIG. 2.

Figure 3:
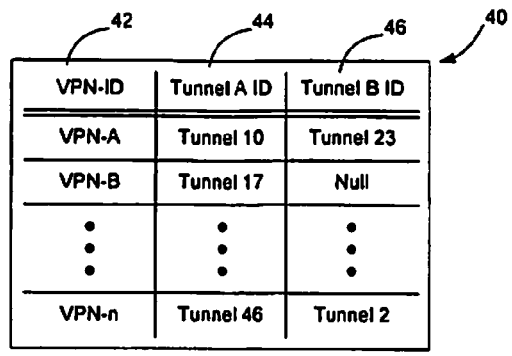
FIG. 3 is a functional block diagram illustrating a VPN forwarding table to be used by the forwarding plane of a network element such as the network element of FIG. 2 according to an embodiment of the invention.

FIG. 3 illustrates one embodiment of a data structure that may be passed to the MIPS to program the forwarding plane according to an embodiment of the invention. As shown in FIG. 3, the data structure 40 includes information associating various VPN connections being handled by the network element with main and standby MPLS tunnels that have been selected to handle traffic of that VPN connection. For example, in the embodiment illustrated in FIG. 3, the forwarding tables include a column of VPN-ID information 42, and associated information indicative of the main MPLS tunnel identification 44 and the standby MPLS tunnel identification 46. Optionally, other MPLS tunnel information may be included as well, such as tertiary MPLS tunnel information or other higher order MPLS tunnel information, and the invention is not limited to using only two MPLS tunnel designations.

The MPLS tunnel information may take many forms and the invention is not limited to a particular embodiment. For example, the MPLS tunnel information may include an MPLS tunnel ID which may be associated with other information specific to the forwarding plane, such as outgoing port and label information. This information may be maintained in a table 40, in another table, or in any other type of data structure. The invention is not limited to the manner in which the forwarding plane implements storage of the information or association of the MPLS tunnel information with physical ports on the network element or MPLS tunnels on the network. Thus, the manner in which the information is stored in the forwarding plane may depend on the implementation details associated with the design of the particular network element.

In the embodiment shown in FIG. 3, the main MPLS tunnel associated with VPN-A is Tunnel 10, and the standby MPLS tunnel associated with VPN-A is Tunnel 23. VPN traffic received for VPN-A will thus be output over Tunnel 10 unless the control plane receives notification that Tunnel 10 is down. Upon failover from Tunnel 10, the forwarding plane will be instructed to use the standby MPLS tunnel for VPN-A, and traffic for VPN-A will automatically be forwarded over standby Tunnel 23. By storing this information in the forwarding plane, the control plane does not need to make a determination as to which MPLS tunnel should be used for the traffic on VPN-A and does not need to communicate the new MPLS tunnel information to the forwarding plane, as the forwarding plane has been pre-programmed with the standby MPLS tunnel information.

Upon failover to the standby MPLS tunnel, the previous standby MPLS tunnel will become the new main MPLS tunnel for that VPN and the standby MPLS tunnel will be set to null until reprogrammed by the control plane. Thus, for example in the example illustrated in FIG. 3, upon failover from Tunnel 10 to Tunnel 23, Tunnel 23 would become the new main MPLS tunnel for VPN-A and, since there is no standby MPLS tunnel, the standby MPLS tunnel value would be set to null until new MPLS tunnel information is supplied by the control plane.

The forwarding tables may contain main and standby MPLS tunnel information for all VPNs being handled by the network element or, as illustrated in FIG. 3, standby tunnel information for some of the VPNs may be unpopulated. For example, in FIG. 3 there is no standby MPLS tunnel designated for VPN-B. A less than fully populated forwarding table may occur for several reasons. For example, a network operator may choose to specify the implementation and designation of a standby MPLS tunnel only for particular classes of VPN connections, such as where the VPN customer has specified the use of fast failover protection in its Service Level Agreement (SLA). Additionally, a less than fully populated table may occur where a failover has just occurred for the VPN and the control plane is in the process of generating new standby MPLS tunnel information to be downloaded to the forwarding plane. Numerous other reasons may cause the forwarding table to be less than fully populated and the invention is not limited to these two particular examples.

By enabling VPN connection information associated with redundant MPLS tunnels to be stored in the forwarding plane, such as main MPLS tunnel information and standby MPLS tunnel information, fast failover from a main MPLS tunnel to a standby MPLS tunnel may be achieved. Specifically, by enabling selection of a failover MPLS tunnel to take place before the failover event occurs, failover is not delayed while the control plane selects a new MPLS tunnel for the failed VPN connection. Additionally, by enabling this selection to be passed to the forwarding plane and maintained in the forwarding plane, reprogramming of the forwarding plane may take place without transmitting the new information to the forwarding plane from the control plane. This further accelerates failover recovery, especially where multiple VPN connections are affected by a given failure.

Figure 4:
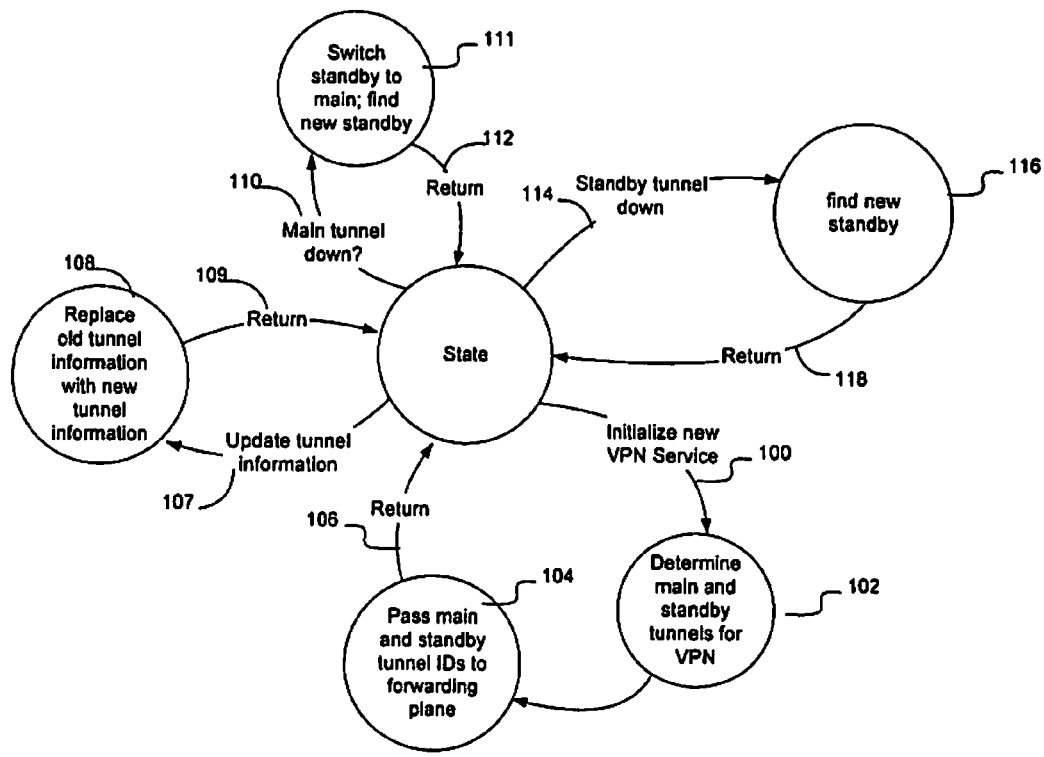
FIG. 4 is a state diagram illustrating a process of handling failover events according to an embodiment of the invention.

FIG. 4 illustrates a process of determining and implementing main and standby MPLS tunnel information in a network element. In the process of FIG. 4, it will be assumed that a suite of MPLS tunnels have been created between the network elements and that VPN services are to be provisioned over the MPLS tunnels. As shown in FIG. 4, when a new VPN service is to be initialized 100, the control plane of the network element determines a main MPLS tunnel and at least one standby MPLS tunnel for the VPN 102. An MPLS tunnel selection algorithm based on bandwidth load balancing, configured policies and/or another metric may be used to select the MPLS tunnels for the VPN, although the invention is not limited to any particular selection algorithm. Optionally, the standby MPLS tunnel may be selected preferentially to be interfaced to the network element over a different I/O card than the I/O card hosting the main MPLS tunnel, although the invention is not limited in this manner either. Selecting the standby and main MPLS tunnels to be hosted by a different I/O card enhances resiliency by not exposing both MPLS tunnels to a single I/O card failure.

The control plane will then pass the main and standby MPLS tunnel information to the forwarding plane 104 to enable the forwarding plane to be programmed to handle traffic for the new VPN. The information passed to the forwarding plane may include the VPN ID, the main and standby MPLS tunnel IDs, the outgoing port, MAC addresses, and many other pieces of information. Once the information has been passed to the forwarding plane, the process returns 106.

The control plane will always maintain the main and standby tunnel information for each VPN connection based on the tunnel selection algorithm. Whenever new MPLS tunnels are activated or active tunnels are deactivated between two PE elements, the tunnel selection algorithm may choose a new main and/or standby tunnel for a VPN 107. The control plane will then pass the new information to the forwarding plane 108 and return 109.

If the control plane receives notice that the main MPLS tunnel is down, or that the I/O port or card hosting the main MPLS tunnel has affected the ability to transport VPN traffic over the outgoing port 110, the control plane will instruct the forwarding plane to forward the VPN traffic over the standby MPLS tunnel 111. This may be done by sending a high priority message to the MIPS processors 44 on the relevant I/O cards instructing the MIPS processors to cause the standby MPLS tunnel to be used instead of the main MPLS tunnel. Since the standby MPLS tunnels have already been determined, the control plane does not need to select a new MPLS tunnel for each VPN affected by the failure. Additionally, since this information has been passed to the forwarding plane, it is not necessary to repopulate the forwarding plane tables with the new MPLS tunnel information. Thus, a very fast failover may be achieved in the forwarding plane.

Once the failover from the main MPLS tunnel to a standby MPLS tunnel has occurred, the standby MPLS tunnel becomes the new main MPLS tunnel for the affected VPNs and the process returns 112. At this point, the control plane may select new standby MPLS tunnel for the affected VPNs. Alternatively, the control plane may select new main and standby MPLS tunnels for the affected VPNs and pass the new MPLS tunnel information to the forwarding plane in due course. Since VPN traffic is being handled by the forwarding plane while the new MPLS tunnel selection takes place, it is not necessary to perform this new MPLS tunnel selection as fast as would have been required if the standby MPLS tunnel information were not available.

If a failure associated with the main MPLS tunnel occurs and a standby tunnel has not been designated, either because a standby couldn't be found or because the standby is currently experiencing failure as well, the VPN traffic will be dropped until the control plane can select a new MPLS tunnel to handle the traffic and program the forwarding plane with that information.

If the standby MPLS tunnel goes down while traffic for a VPN is being handled by the main MPLS tunnel 114, the forwarding plane will continue to handle the traffic using the main MPLS tunnel. Thus, no failover need occur and the control plane can simply find a new standby MPLS tunnel for the VPN. The control plane will select a new MPLS tunnel for the VPN traffic 116 and will pass that MPLS tunnel information to the forwarding plane to program the forwarding plane with the new standby MPLS tunnel information. Other operations may take place as well and the invention is not limited to these several states or to a process that implements these particular states The control logic described herein may be implemented as a set of program instructions that are stored in a computer readable memory within the network element and executed on a microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that all functional statements made herein describing the functions to be performed by the methods of the invention may be performed by software programs implemented utilizing subroutines and other programming techniques known to those of ordinary skill in the art. It also should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A network element, comprising:
   a forwarding plane configured to forward packets on a packet network; and
   a control plane configured:
   to determine a primary Multiprotocol Label Switching (MPLS) tunnel to a destination network element for a Virtual Private Network (VPN), the primary MPLS tunnel traversing a first input/output (I/O) card;

to determine a secondary MPLS tunnel to the destination network element for the VPN, the secondary MPLS tunnel traversing a second I/O card different from the first I/O card; and after determination of the primary and secondary MPLS tunnels:
- to signal the forwarding plane to forward packets associated with the VPN over the primary MPLS tunnel;
- to detect a failure associated with the primary MPLS tunnel; and
- in response to detection of the failure, to signal the forwarding plane to forward the packets associated with the VPN over the secondary MPLS tunnel.

2. The network element of claim 1, wherein the control plane is further configured, after signaling the forwarding plane to forward the packets associated with the VPN over the secondary MPLS tunnel, to determine a new secondary MPLS tunnel to the destination network element for the VPN, the new secondary MPLS tunnel avoiding the detected failure.

3. The network element of claim 2, wherein the control plane is further configured:
- after signaling the forwarding plane to forward the packets associated with the VPN over the secondary MPLS tunnel, to designate the secondary MPLS tunnel as the primary MPLS tunnel for the VPN; and
- after determining a new secondary MPLS tunnel to the destination network element for the VPN, to designate the new secondary MPLS tunnel as the secondary MPLS tunnel for the VPN.

4. The network element of claim 1, wherein the control plane is further configured, after determination of the primary and the secondary MPLS tunnels:
- to detect a failure associated with the secondary MPLS tunnel; and
- in response to detection of the failure, to determine a new secondary MPLS tunnel to the destination network element for the VPN, the new secondary MPLS tunnel avoiding the failure.

5. The network element of claim 1, wherein the primary MPLS tunnel traverses at least a first intermediate MPLS router and the secondary MPLS tunnel does not traverse the at least the first intermediate MPLS router.

6. The network element of claim 5, wherein the secondary MPLS tunnel traverses at least a second intermediate MPLS router different from the at least the first intermediate MPLS router.

7. The network element of claim 1, wherein:
- the primary MPLS tunnel traverses a first plurality of intermediate routers; and
- the secondary MPLS tunnel traverses a second plurality of intermediate routers, the second plurality of intermediate routers not including intermediate routers of the first plurality of intermediate routers.

8. The network element of claim 1, wherein the control plane is configured to determine a plurality of respective primary MPLS tunnels and respective secondary MPLS tunnels for a plurality of VPNs.

9. The network element of claim 8, wherein the control plane is configured to maintain a table associating the plurality of VPNs with the respective primary MPLS tunnels and the respective secondary MPLS tunnels.

10. The network element of claim 9, wherein the control plane is configured to maintain network topology information for use in determining the respective primary MPLS tunnels and the respective secondary MPLS tunnels.

* * * * *